Nov. 19, 1968　　　　T. C. FRITZ ET AL　　　3,411,942
METHOD OF APPLYING LIQUID ADDENDUM TO OPPOSITE
SURFACES OF A CONTINUOUS MULTIFILAMENT TOW
Filed Dec. 21, 1964　　　　　　　　　　　　　5 Sheets-Sheet 1

THEODORE C. FRITZ
RICHARD F. DYER
INVENTOR.

BY R. Frank Smith
Abram W. Hatcher

ATTORNEYS

THEODORE C. FRITZ
RICHARD F. DYER
INVENTOR.

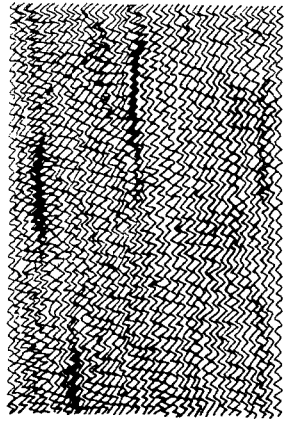
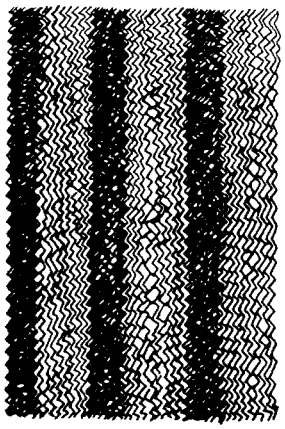
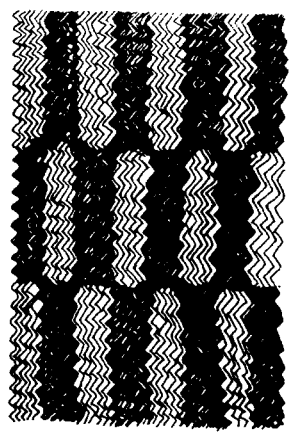
FIG. 6.   FIG. 7.   FIG. 8.
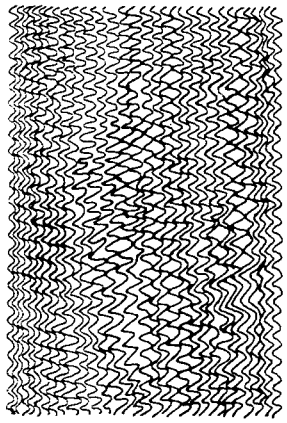
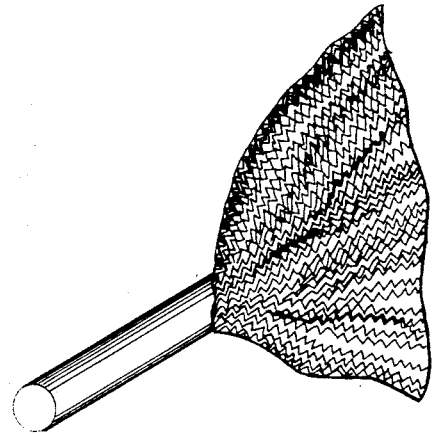
FIG. 10.   FIG. 9.

US Patent Office
3,411,942
Patented Nov. 19, 1968

3,411,942
METHOD OF APPLYING LIQUID ADDENDUM TO OPPOSITE SURFACES OF A CONTINUOUS MULTIFILAMENT TOW
Theodore C. Fritz and Richard F. Dyer, Kingsport, Tenn., assignors to Eastman Kodak Company, Rochester, N.Y., a corporation of New Jersey
Filed Dec. 21, 1964, Ser. No. 419,748
1 Claim. (Cl. 117—68)

ABSTRACT OF THE DISCLOSURE

A method and apparatus features an opposed dual roll arrangement for applying liquid addendum in uniform quantities to both sides of a continuous multifilament tow. Wick applicators are positioned against the rolls of the arrangement and meter predetermined quantities of addendum onto each roll surface, after which the addendum is deposited onto the tow passing between the rolls.

---

This invention relates to treatment of continuous filament tow useful in the manufacture of nonwoven products such as filter elements and the like. More particularly it relates to apparatus for applying liquid addendum to continuous filament tow and its use in imparting to said tow a potentially adhesive nature while at the same time improving uniformity of the treated tow, particularly that formed into vapor-permeable nonwoven rod-like elements.

Our co-workers, Caines and Pannill, along with inventor Dyer in U.S. Patent 3,099,594 disclose jointly mounted hollow-tube or slot applicators positioned so as to meter plasticizer or the like liquid additive directly onto both sides of a flat ribbon of tow as it passes respectively under a downwardly facing slot tube and over an upwardly facing slot tube. While such an arrangement has been highly successful for use in applying addendum to tow, occasionally some dripping of liquid additive occurs which may at times tend to result in slight irregularities in uniform application. Therefore it is apparent that an applicator which may be used without substantial dripping and with increased uniformity of application of additive represents a highly desirable result. After extended investigation we have found just such an apparatus and process whereby plasticizer or the like may be uniformly applied to spread tow filaments with minimal formation of undesirable clusters of unseparated filaments, high density concentrations of filaments, or the like.

One object of this invention is to provide an apparatus and method of treating tow to give a substantially uniform application of addendum. Another object is to provide an applicator and method for its use in improving uniformity of treated tow. A further object is to provide a way of decreasing the amount of liquid additive required for desired tow uniformity and compatibility. Further objects will be apparent hereinafter.

In its broader aspects our invention involves applying liquid addendum to substantially the entire width of both surfaces of a ribbon of tow by passing same between rolls rotating in opposite directions as the addendum seeps onto the rolls from a specially constructed wick applicator. The wicks may be adjusted so as to continue to touch the rolls approximately at a point opposite the nip through which the tow undergoing treatment moves.

Our invention further involves in combination the steps of spreading the tow under a light tension, mechanically operating on the spread tow to induce an intermittent, incremental longitudinal filament to filament displacement, transferring a thin uniform film of bonding agent or other liquid addendum to the separated spread-out filaments of the tow, subjecting the tow to treatment in a high velocity fluid zone to further displace and separate the filaments and even out any irregularities of filament displacement which may be present and to further distribute bonding agent in an even manner on the filaments and then forming the treated tow into tobacco smoke filter elements.

According to one embodiment of our invention prior to application of additive the tow, after banding, is first passed between pretensioning rolls, then between a pair of rolls at least one of which may have a square-grooved surface and, before passing between the rolls which apply the additive, through a jet which further spreads the tow. In this embodiment, after application of additive the tow may either be passed next through a venturi air jet and then guided into a garniture for forming rod-shaped elements or passed through another banding jet before having carbon or other particulate additive applied from a hopper preliminary to heating for bonding said particulate additive to tow and then forming into filter elements or the like.

The wick applicators may be piston operated so as to be positioned against the rolls to which they feed liquid addendum while in operation and removed from contact when desired. Plasticizer or other additive passes through a conduit into the applicator from one end above a wick-holding receiver portion and then at a right angle into a rectangular trough or receiver from which it supplies the wick. A specially constructed screw-bolt arrangement permits advancing the wick as necessary to keep it in contact with the rolls for applying additive evenly along the entire width. Another feature of the applicator is a pin which holds it in place until removal thereof by depressing its movable nubs permits easy detachment of both applicator and rolls. When the applicators are positioned so as to apply plasticizer or the like vertically, the bottom one may contain a built-in lip shaped generally with the contour of the circular roll to prevent dripping.

For a further understanding of our invention reference is made to the drawing in which.

FIGS. 6, 7, 8, and 9 are schematic top views of tow treated according to various prior art procedures.

FIG. 10 is a schematic top view of tow treated using the process and apparatus of this invention.

Figure 1:
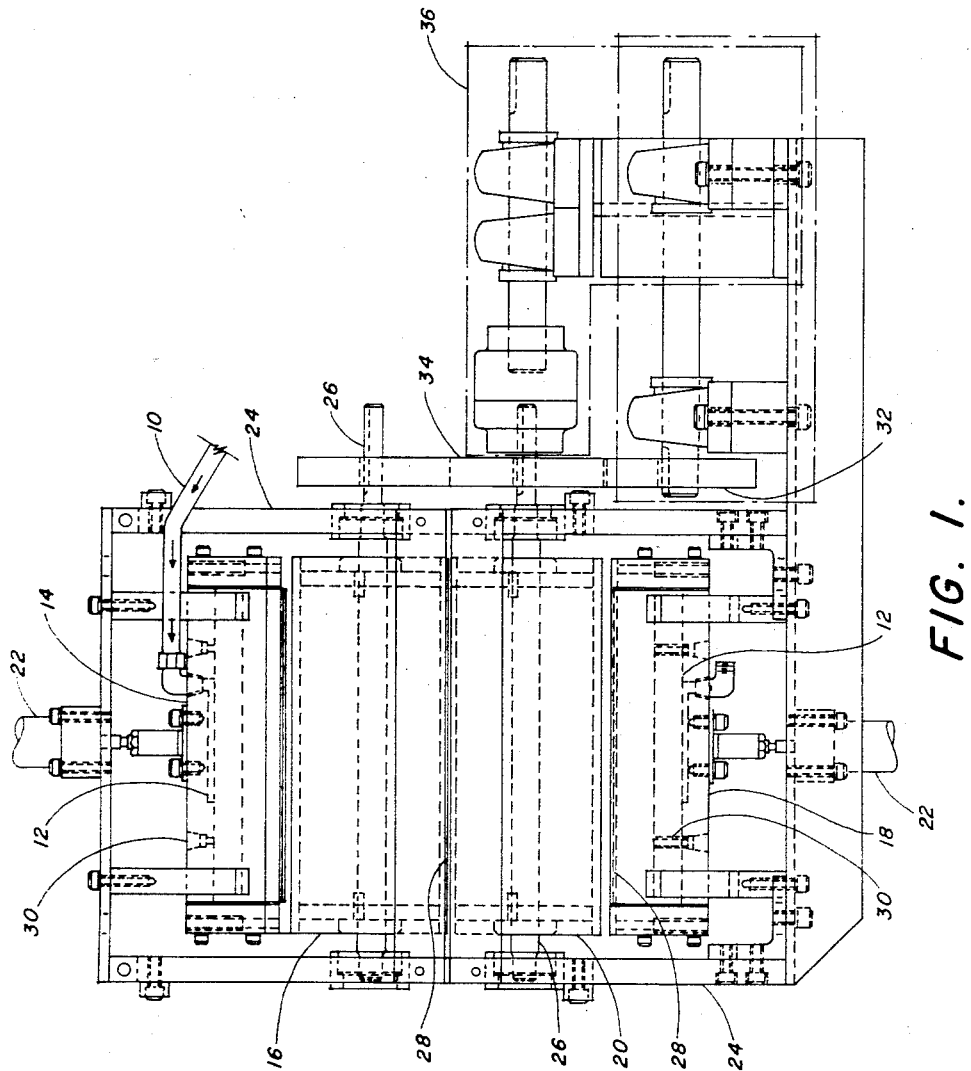
FIG. 1 is a transverse section of the twin applicator of this invention and associated parts in operational position against tow feed rolls. Substantially identical halves or parts are pictured which are adapted for applying addendum to the tow by way of both rolls.
Figure 2:
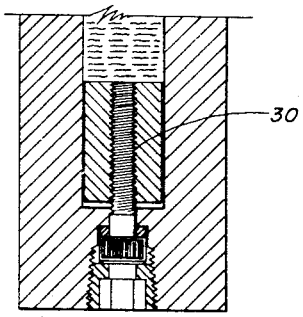
FIG. 2 is an enlargement of a wick adjusting screw of FIG. 1.

Referring first to FIG. 1 plasticizer or other appropriate liquid addendum passes via feed line 10 into the reservoir 12 of substantially rectangular-shaped applicator 14, which is positioned directly above an upper tow feed roll 16. Applicator 18 is similarly positioned directly below a lower tow feed roll 20 with like substantially symmetrical parts having like numbers to those of the upper roll and applicator. Applicator 14 is positioned against roll 16 by an air-operated cylinder 22. The framework within which rolls and applicators are positioned is indicated generally by 24 with drive shafts shown as 26. The arrows show generally how addendum passes through reservoir 12 to felt or the like wick 28, which may be adjusted by screw 30 (shown in enlarged form in FIG. 2) so as to just touch roll 20 (or 16) sufficiently to apply addendum uniformly to the entire surface thereof as the rolls turn to conduct tow through the nip formed therebetween. By use of adjustable screw 30 the wick surface can be renewed as desired as it wears. When desired to reverse the direction of movement of the rolls, gear and shaft 32 may be used in place of gear and shaft 34, according to arrangement 36.

Figure 3:
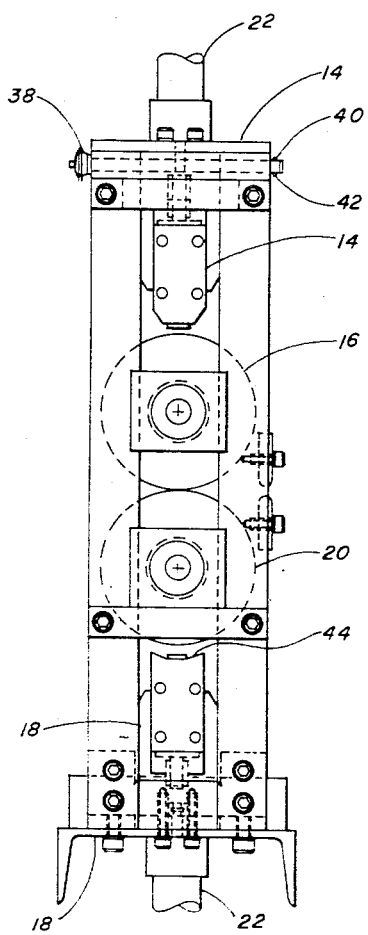
FIG. 3 is an end view of the applicator arrangement of FIG. 1.

In FIG. 3 two additional features of the applicator arrangement of our invention are shown in more detail. Quick release pin 38 may be readily removed simply by depressing nubs 40 so as to permit successive disassembly of the various parts with ease. Lower applicator 18 contains a built-in drip lid 44 to prevent spillage of liquid addendum.

Figure 4:
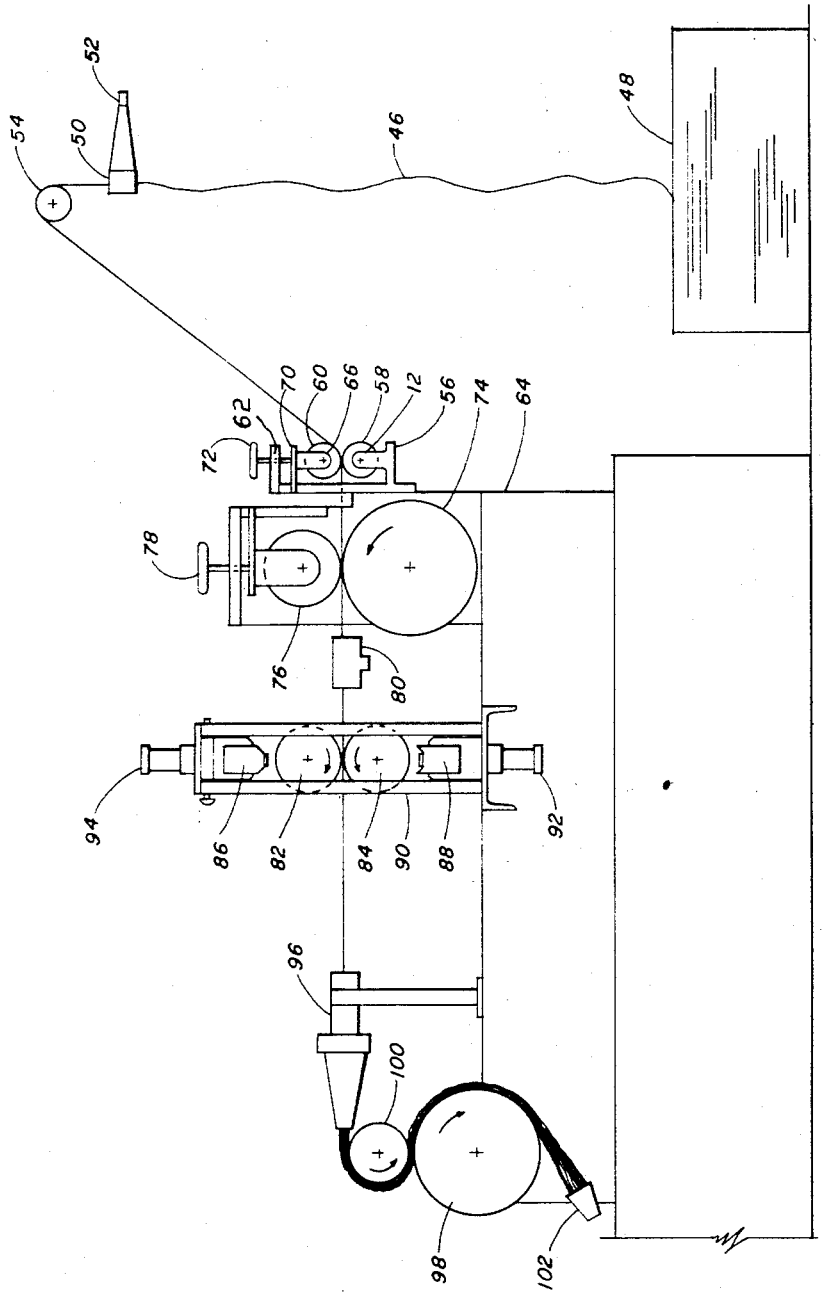
FIG. 4 is a side elevation view of an apparatus combination such as may be used according to the present invention.

Referring now to FIG. 4, which illustrates one way in which tow may be treated with application of addendum according to our invention, a continuous multifilament crimped tow 46 is withdrawn upwardly from supply package 48 through a spreading or banding jet 50 supplied with air through pipe 52 such as described in our coworker Jackson's patent, U.S. 2,737,688, or Dyer et al., 3,081,951, and over fixed guide 54 or alternately a freely rotatable roller guide. It passes downwardly to a pretensioning apparatus 56, passing between rolls 58 and 60. Bottom roll 58 is rotatably mounted by suitable means to fixed bracket 62 which is attached to the main frame 64 of the apparatus. Top roll 60 is rotatably mounted to a movable bracket 66 which is attached to fixed bracket 62 by a leaf spring hinge 70. The top roll 60 is loaded downwardly against bottom roll 58 by means of a pneumatic diaphragm plunger or a weighted plunger 72. The tow 46 passes from the nip of pretension rolls 58 and 60 forward to the nip of further rolls 74 and 76, which are driven from the main drive (not shown) of the plug making machine or garniture 102. The tension of the tow 46 entering feed rolls pair 74 and 76 is determined by the drag force imposed on the tow by the countercurent air flow on banding jet 50, the frictional drag force of the tow in passing over fixed guide 54 or the frictional bearing drag of the guide if a roller guide is used and the drag force generated by the frictional drag of the pretension rolls 58 and 60, which is adjustable by means of the force applied to top roll 60 by the pneumatic or static weight loading means 72. This pretension on the tow entering the pulling feed rolls should be at the minimum sufficient to remove the secondary crimps or folds in the tow without substantially straightening out the primary or fine crimp in the individual filaments.

A roll pair 74 and 76 are mounted in much the same way as roll pair 58 and 60. That is, bottom roll 74 is rotatably mounted in suitable bearings which in turn are fastened to the machine framework 64. Bottom roll 74 is positively driven by connection (not shown) to the main drive of the machine.

Top roll 76 may have a configured surface, e.g., one with a plurality of circumferential square-form cross-section grooves and lands. These grooves and lands may be interrupted at intervals around the circumference of the roll or be continuous. Further description of such a roll may be found in coworker Fritz' U.S. patent application Serial No. 259,852 now Patent No. 3,255,506 and accordingly need not be further discussed herein. Top roll 76 is loaded pneumatically or with static weights 78 to press it against bottom roll 74, which preferably has a resilient smooth surface such as rubber with a hardness of about 55–65: Short "A" Durometer. Top roll 76 is frictionally driven by bottom roll 74. Portions of tow which are passed between the nip of a land on top roll 76 and the smooth surface of bottom roll 74 are pulled against the tension generated by roll pair 58 and 60 and are also displaced forwardly a small increment relative to adajcent portions of the tow, which are incompletely or not gripped at all in the nip of rolls 74 and 76 due to the grooves in roll 76. Thus the filaments in portions of the tow are longitudinally incrementally displaced relative to the filaments in adjacent portions of the tow so that the filaments are separated one from the other.

If the grooves and lands are continuous around the roll 76 the tow takes on an appearance as shown in FIG. 7. If the grooves and lands are discontinuous the tow has the appearance shown in FIG. 8. In both these figures it will be apparent that the density of the concentration of the filaments is variable due to the action of rolls 74 and 76. The continuous grooves impart a continuous ribbed or corduroy effect to the tow while the interrupted grooves impart an elongated checkerboard pattern. Thus, while both types of roll do separate and open the filaments, the action may be occasionally incomplete or non-uniform. Thus, in these instances smoke may tend to channel through the zones of lesser filament concentration density and the over-all effectiveness of the filter may be somewhat impaired.

If plain rolls are used in conjunction with air jets as in U.S. Patent 3,079,663 to co-inventor Dyer et al. and U.S. 3,099,594 to co-inventor Dyer and others, some filaments may not be separated completely from one another when fine denier, 1.0 to 3.0 denier per filament, tows are being processed. Thus careful examination of a filter tip made from fine denier tow on this process may reveal occasional clusters of 2 to 5 filaments that are not separated from each other. This prior art condition is depicted in FIGS. 6 and 9.

Such possible non-uniformity may be overcome by using applicators according to our invention.

After leaving the pulling or feed rolls the opened tow is passed through a further pneumatic banding jet 80 of type such as banding jet 50 to further spread the width of the tow band and also to control it at a fixed width preparatory to coating a film of adhesive on the top and bottom surfaces of the tow in the next processing step.

The tow 46 after being subjected to the differential pulling action of rolls 74 and 76 in conjunction with pretension or drag rolls 56 and 60 and being further spread out to a constant uniform width by pneumatic jet 80 is then advanced to roll pair 82 and 84, which are in geared relation to each other and are driven by positive means from a main machine drive. Roll pair 82 and 84 (comparable to rolls 16 and 20 of FIGS. 1 and 3) may be used to print or transfer a uniform film of adhesive material or softening agent such as a plasticizer onto the top and bottom surfaces of the opened tow. To accomplish this, a wick applicator 86 is vertically disposed over the top of roll 82 and a second wick applicator 88 is disposed vertically beneath roll 84 with the wicks in contact with the smooth roll surfaces of rolls 82 and 84. The length of wicks in contact with rolls 82 and 84 is substantially equal to the width of banding jet 80. Thus all the material deposited by the wicks on the rolls is removed by the tow as it passes through the rolls and the width of the film of liquid material deposited on the rolls is wide enough so that all the filaments across the surface of the spread tow come in contact with the liquid.

Both applicators are slidably mounted for vertical movement in a holder frame 90. Both applicators are attached to matching retraction means 92 and 94, which may be solenoids or air cylinders in such a manner that the wicks may be moved into contact with matching rolls 82 and 84 or retracted from contact as desired. A bonding agent for the tow such as triacetin is supplied by matching metering pumps and tubing (see FIG. 1). This permits a controlled amount of triacetin to be metered to each wick applicator. The triacetin is forced through the wicks under the pressure generated by the metering pumps. The wicks coat a thin film of triacetin on the top roll 82 and bottom roll 84. The opened tow passing through the nip of these rolls picks up the triacetin and is thereby placed in a potentially adhesive state.

By applying the triacetin from a film on the rolls to both the top and bottom surfaces of the tow, a better distribution of triacetin is obtained than in the prior art methods of spraying particles of triacetin or wiping the triacetin onto the tow. Particulate sprays for example tend to not form a uniform film of binder on the filaments but rather to form a spotted or polka dot like pattern of distribution such that spots on the filaments where a droplet is attached may have an excess of binder while adjacent areas with no droplets may have no binder. When binder is applied by a wiping action, a tow section may wipe the applicator clean and the portion of tow immediately following have no binder applied until the applicator is replenished with binder. Moreover, in prior art arrangements the tow generally snubs over the applicator at an angle to insure good contact, which may result in a snubbing tension which tends to remove some crimp from the tow filaments and to reduce the ability of a tow to firmly fill the finished filter tip. Thus a heavier tow may be required which results in more weight of tow being necessary to make a given filter or more binder being necessary to make the filter firm enough for practical use.

After passing through the nip of the binder applicator rolls 82 and 84 at the same speed as the surface speed of the rolls to avoid any wiping action, the tow is forwarded to a venturi air jet 96. This jet may be of the general construction shown in co-inventor Dyer et al. U.S. Patent 3,099,594 or in co-inventor Dyer et al. U.S. 3,081,951. The purpose of this jet is to further open the tow by separating the filaments from each other, to even out the irregularities in the density of the filament distribution caused by the opening action of pulling rolls 74 and 76 and to further redistribute and even out the film of addendum on the filaments and to redistribute the filaments on the top and bottom surface of the opened tow into the structure of the tow.

The change in the structure of the tow as a result of the venturi jet treatment is most readily seen when the slot type jet of Dyer et al. U.S. Patent 3,081,951 is used and the tow retains its spread-out configuration. FIG. 10, which shows the spread, opened tow after treatment in a jet such as that of U.S. 3,081,951 clearly indicates the improved uniformity of filament distribution as compared to the mechanically opened (non-jet treated) tows of FIGS. 7 and 8. Likewise, comparison of FIG. 10 depicting the mechanically opened and jet treated tow to FIG. 6, which depicts the prior art jet-treated, non-mechanically, longitudinally displaced tow of Dyer et al. U.S. Patent 3,079,663, shows the improved separation of the filaments and freedom from clusters of unopened filaments of the process of this invention.

From the preceding description, therefore, it should be apparent that the combination of a process which mechanically longitudinally displaces the filaments with a venturi jet treatment results in a more uniform intermediate product with better filament separation for use in tobacco smoke filters. It is further evident that tow treated by the process and apparatus of this invention will as a result produce filters of better uniformity and efficiency of tow utilization.

In some instances it is desirable immediately after the adhesive application step to begin to form the tow into the cylindrical configuration it will assume in the finished tobacco smoke filter. This can be readily accomplished by use of the circular venturi jet of co-inventor Dyer et al. U.S. Patent 3,099,594, described in further detail in Dyer U.S. 2,924,868. In this case the evening out of the non-uniform filament distribution caused by the mechanical opening may be accomplished with much the same efficiency as with the slot venturi jet mentioned previously. This may be seen by breaking open a finished filter tip and carefully examining the internal filament arrangement in the plug or by examining the discoloration of a filter tip on a smoked filter cigarette. In the latter instance the discoloration of the end of the filter due to the tars collected by the filter in smoking a filter cigarette will be more uniform over the end of the filter in the mechanically opened jet treat tow of this invention than in either the solely mechanically opened or solely jet opened tow-filters of the prior art.

Since the opened, liquid-treated, jet-treated tow passes through further feed rolls 98 and 100 prior to entering the filter rod cylindrical forming garniture 102, it is evident that if the tow has already been partially shaped into a cylindrical form less of the liquid will be lost to the atmosphere or coated onto the rolls 98 and 100 due to the reduced surface area of the bundled-up tow as compared to a spread-out tow. Moreover, there will be less folding and crumpling of the tow if it is formed from a sheet into a cylinder by an air jet than if it is condensed from a thin sheet about 8 inches in width into the small opening of 1 inch or less in diameter in the filter-forming garniture 102.

All of the driven rolls of the apparatus may be connected either directly or through each other to the main drive of the filter plug maker so that carefully controlled positive speed ratios may be established between pulling rolls 74 and 76, liquid applicator rolls 82 and 84, delivery rolls 98 and 100 and the tape roll (not shown) of filter forming garniture 102. In some cases it is desirable to insert positive variable speed devices in the drive trains between the various roll positions so that the tow opening and delivery roll speeds may be adjusted to suit the requirements of a given size and type of filter tow or the specifications of weight and pressure drop. For further convenience, all the apparatus elements may be mounted on common-frame 64 so that the entire unit may be quickly set in place on a cigarette forming machine, thus enabling quick conversion from production of tobacco rods to filter rods and vice versa without excessive loss of machine time.

The apparatus and process of this invention have unique features of versatility not present in tow processing machines of the prior art. For example, in some cases it may be desired to increase the removal of the phenol component from cigarette smoke. In this case a high molecular weight polyethylene glycol liquid additive has been found to be quite effective. However, when such a material is added to the triacetin bonding adhesive, the bonding power and hence the hardness of the filter rod is impaired. We have found, however, that by applying the polyethyleen glycol through one of the wicks to one surface of the tow and the triacetin through the other wick to the opposite side of the spread tow that the bonding action of the triacetin is not impaired and firm tobacco smoke filter rods with a high phenol removal characteristic can be readily produced.

Figure 5:
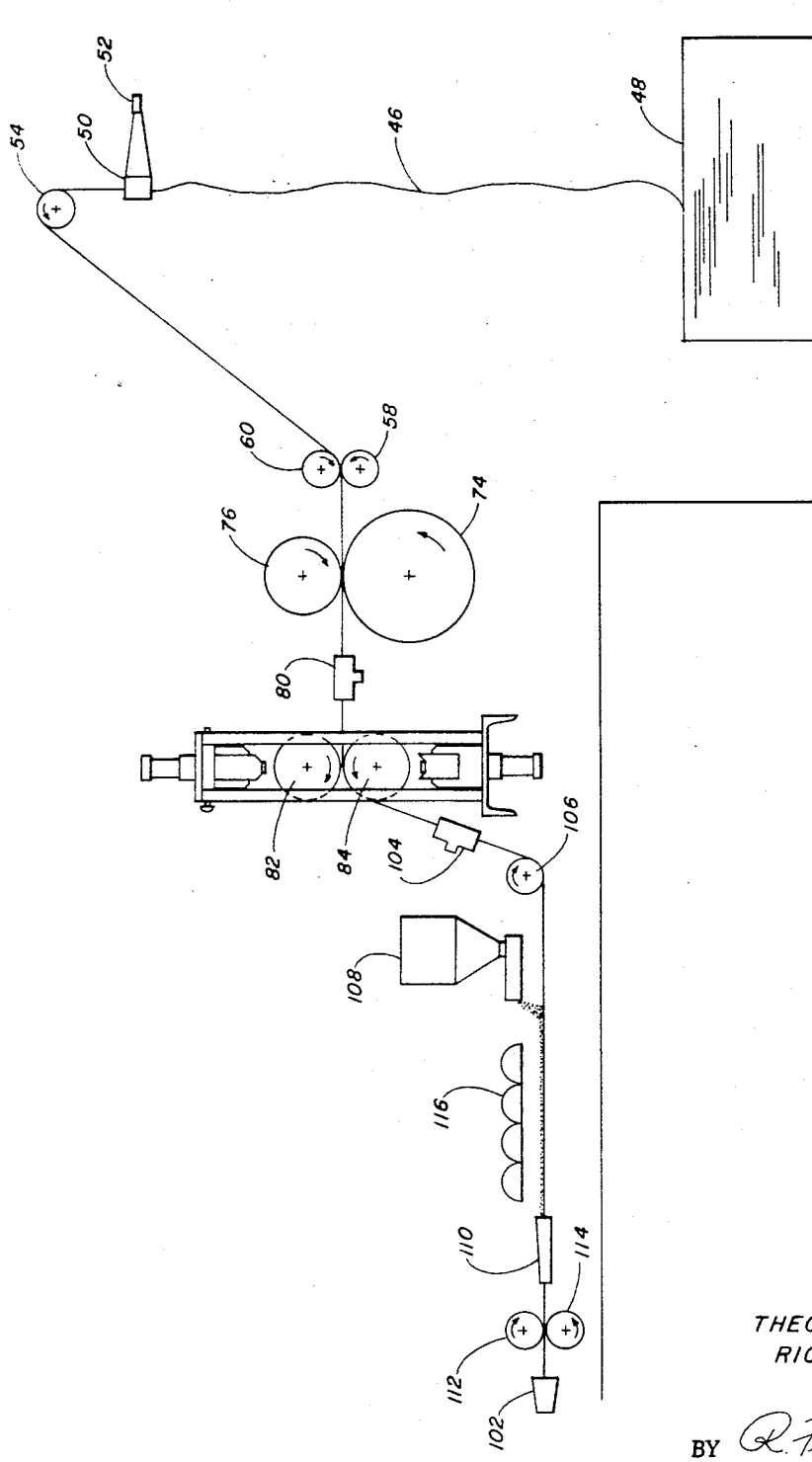
FIG. 5 is a side elevation of the details of one form of our particulate additive applicator.

We have further found that a change in the path of the tow as it leaves the adhesive applicator rolls as seen in FIG. 5 (like parts numbered as in FIG. 4) makes it possible to add particulate additives like activated carbon, fiber flock, and starch to impart such features as high selective removal for acetaldehydes or higher tar removals to filter rods. Thus, in the arrangement of FIG. 5 the tow is passed downwardly from the adhesive applicator roll 84 through banding jet 104 to a roller guide 106 located so that the tow passes a flat sheet toward the rod-making garniture 102. A vibrating feeder 108 for particulate material is located adjacent to and extending over the spread tow sheet in the horizontal zone so that activated carbon, starch or other particulate materials may be deposited uniformly on the spread tow. The tow then passes to a forming funnel 110, then through a small grooved pair of delivery rolls 112 and 114 to the garniture 102 of the filter rod maker.

If desired, a solid particulate binder such as a 50-mesh, low melting point polyethylene powder may be mixed with the particulate additive and fed with it onto the spread tow. In this instance, liquid applicator rolls 82 and 84 and associated parts need not be used and the tow 46 may be passed through the air spreading jet 80 downwardly in a substantially straight course to guide 106. Heating elements 116 may then be disposed over the tow to activate the binder particles to cause them to melt and bond the additive to the tow filaments.

Having described in considerable detail the unique features and advantages of the apparatus and the process of our invention, specific examples will now be given to further illustrate these and other advantages over the prior art.

EXAMPLE I

A 1.6 denier/filament, 48,000 total denier cellulose acetate tow with oval cross section filaments was used to produce filter rods on the process of co-inventor Dyer et al. U.S. Patent 3,099,594 using jet blooming only with an "S" wrap wiping-type plasticizer applicator. The machine operating conditions and test results were as given under the heading of Sample 1 in Table I below.

The same tow was then processed on the apparatus of this invention as shown in FIG. 4. The machine setup and test results are listed under the heading of Sample 2 in Table I.

Comparison of the tow appearance after treatment indicated that the Sample 1 tow contained several unseparated or unbloomed filaments as shown in FIGS. 6 and 9.

EXAMPLE II

The same tow used in Example I was processed on a square-grooved roll (the mechanical blooming process) such as that of co-inventor Fritz' application Serial No. 259,852, using for Sample 4 (Table I) an interrupted square form groove roll and for Sample 5 (Table I) a continuous grooved roll. Machine set-up and filter rod test data are listed in Table 1 under the appropriate sample number headings.

Visual examination of the bloomed tow of Samples 4 and 5 indicated a less uniform separation and distribution of the filaments (FIGS. 8 and 7) respectively than for the tow of FIG. 10 bloomed by using the process and apparatus of this invention (Samples 2 and 3 in Table I).

The data show a lower pressure drop and lower tar removal for the prior art Sample 4 and Sample 5 rods as compared to the Sample 2 and Sample 3 rods of this invention. Prior art Samples 4 and 5 filter rods had only 23.4 to 23.5 inches of pressure drop per gram of tow as compared to 25.7 to 26.1 inches pressure drop per gram of tow for the Sample 2 and 3 filter rods of this invention. While the uniformity of the grooved roll process Sample 4 was good, this uniformity was accompanied by a somewhat lower tar removal, somewhat less efficient tow utilization, and some loss of rod hardness.

TABLE I

| Sample Number | 1 | 2 | 3 | 4 | 5 |
|---|---|---|---|---|---|
| D/F | 1.6 | 1.6 | 1.6 | 1.6 | 1.6 |
| Total Denier | 48,000 | 48,000 | 48,000 | 48,000 | 48,000 |
| Filament Cross Section | Round | Round | Round | Round | Round |
| Filter Length, mm | 102 | 102 | 102 | 102 | 102 |
| Filter Circumference, mm | 24.83 | 24.85 | 24.88 | 24.82 | 24.82 |
| Plasticized Rod Weight, Grams: | | | | | |
|   Average | .827 | .875 | .853 | .764 | .805 |
|   Standard Deviation | .019 | .021 | .020 | .008 | .016 |
| Rod Pressure Drop, Inches of Water: | | | | | |
|   Average | 18.1 | 18.0 | 18.2 | 14.8 | 16.1 |
|   Standard Deviation | 1.149 | 0.616 | 0.725 | 0.332 | 0.617 |
| Hardness 0.1 mm. Penetration: | | | | | |
|   Average | 7.1 | 6.2 | 6.5 | 13.6 | 9.0 |
|   Range | 4.8–9.7 | 4.7–7.9 | 5.5–7.4 | 11.5–15.5 | 7.8–10.5 |
| Percent Plasticizer (Triacetin) | 9.4 | 12.9 | 7.9 | 7.3 | 7.0 |
| Tow per Rod, grams | .681 | .694 | .709 | .634 | .685 |
| Inches Pressure Drop per gram of Tow | 26.7 | 26.1 | 25.7 | 23.4 | 23.5 |
| Tar Removal | 57 | 57 | 58 | 50 | 53 |
| Speed Ratios: | | | | | |
|   Feed 14/15 to Delivery 29/30 | 1.39 | 1.55 | 1.62 | 1.70 | 1.31 |
|   Feed 14/15 to Tape 31 | 1.22 | 1.33 | 1.33 | 1.64 | 1.24 |
|   Feed 14/15 to Tension 8/9 | 1.45 | 1.55 | 1.56 | 2.35 | 1.70 |
|   Feed 14/15 to Applicator 22/23 | | 1.24 | 1.21 | | |
| Plasticizer Pump, r.p.m | 72 | 72 | 43 | | |

By contrast, the same tow processed on the apparatus of FIG. 4 of this invention was substantially free of unbloomed filaments and had the appearance of the tow shown in FIG. 10.

It was further noted that although the plasticizer metering pump speed remained constant, 12.9% plasticizer was applied to the tow in the process of FIG. 4, while only 9.4% was applied to the tow by the prior art process.

It was further noted that the standard deviation of the pressure drop of the rods of Sample 2 made on the apparatus of FIG. 4 was 0.616 as compared to 1.149 for the Sample 1 rods made on the prior art apparatus.

The same tow was then processed again on the same setup in FIG. 4 as Sample 3 of Table I of this invention except that the plasticizer metering pump speed was reduced about 40% to about 43 r.p.m. The filter rods were then examined for hardness and quality of bond and found to be at least equal to the prior art rods of Sample 1.

From the foregoing it may be seen that the apparatus and process of this invention makes possible a 40% to 46% reduction in the pressure drop standard variation and an improved uniform appearance of rods. Since pressure drop is directly related to tar removal, a similar improvement in tar removal uniformity, thus resulting in more uniform taste and flavor in cigarettes, is also achieved by the filter rods made by the apparatus and process of this invention.

While the process and apparatus of our invention has been compared using 1.6 denier per filament oval section cellulose acetate tow, similar results may be obtained when non-circular cross section filament tows with larger or smaller filament sizes and of different compositions such as polyolefin, polyamide, polyester or the like are used.

From the foregoing description and examples it may be seen that we have provided an improved method and apparatus for uniform application of liquid addendum to continuous filament tow as well as an improved process for manufacture of filter elements of acceptable pressure drop and tar and phenol removal characteristics.

Although the invention has been described in considerable detail with reference to certain preferred embodiments thereof, it will be understood that variations and modifications can be effected without departing from the spirit and scope of the invention as described hereinabove and as defined in the appended claims.

We claim:
1. An improved method for applying liquid addendum to opposite surfaces of a continuous multifilament tow comprising:
 (a) metering a predetermined amount of said addendum into reservoirs located on opposite sides of said tow;
 (b) applying the addendum to separate rotatably mounted means in such manner that at least portions of the surfaces of said means are coated with a thin uniform layer of said addendum;
(c) rotating said means in contact with the continuous multifilament tow; and
(d) simultaneously transferring said addendum from said means to the opposite tow surfaces and uniformly distributing said addendum thereon.

References Cited

UNITED STATES PATENTS

| | | | |
|---|---|---|---|
| 3,255,506 | 6/1966 | Fritz | 28—1 |
| 2,794,480 | 6/1957 | Crawford et al. | 156—441 |
| 3,297,512 | 1/1967 | Cobb et al. | 156—166 XR |
| 2,774,680 | 12/1956 | Hackney et al. | 156—299 XR |

PHILIP DIER, *Primary Examiner.*